United States Patent

Kawamura et al.

[11] Patent Number: 6,065,801
[45] Date of Patent: May 23, 2000

[54] REAR DRAIN CHANNEL ARRANGEMENT FOR AN AUTOMOTIVE SUNROOF

[75] Inventors: Kiichi Kawamura; Hiroyuki Tsukamoto, both of Tochigi, Japan

[73] Assignee: Yachiyo Kogyo Kabushiki Kaisha, Saitama-ken, Japan

[21] Appl. No.: 09/234,771

[22] Filed: Jan. 20, 1999

[30] Foreign Application Priority Data

| May 19, 1998 | [JP] | Japan | ................................. | 10-136207 |
| Jun. 24, 1998 | [JP] | Japan | ................................. | 10-176955 |
| Sep. 11, 1998 | [JP] | Japan | ................................. | 10-258156 |

[51] Int. Cl.[7] .............................. B60J 7/00; B60J 7/043
[52] U.S. Cl. ...................................... 296/213; 296/216.08
[58] Field of Search ............................ 296/213, 216.07, 296/216.08, 216.06, 216.09

[56] References Cited

U.S. PATENT DOCUMENTS

4,275,919  6/1981  Okamoto et al. ....................... 296/214
5,718,472  2/1998  Otake et al. ............................. 296/221

*Primary Examiner*—Joseph D. Pape
*Assistant Examiner*—Patricia Engle
*Attorney, Agent, or Firm*—Skjerven, Morrill, MacPherson, Franklin & Friel LLP; Alan H. MacPherson

[57] ABSTRACT

In a frameless type automotive sunroof system, a pair of depending pieces extend from either side end portion of a rear drain channel member, and these depending pieces are each fitted into an opening formed in a rear end portion of a side frame member via a connecting member to attach the rear drain channel member across the side frame members. The connecting member adapted to be fitted in an opening formed in one of the side frame members, and having an upper slot adapted to receive the depending piece, and the connecting member is provided with a first snap fit arrangement for engagement with the side frame member opening, and a second snap fit arrangement for engagement with the depending piece. Thus, the attachment of the rear drain channel member to the side frame members can be accomplished simply by pushing the depending pieces into the openings in the corresponding side frame members with the connecting members interposed between them.

15 Claims, 9 Drawing Sheets

REAR DRAIN CHANNEL ARRANGEMENT FOR AN AUTOMOTIVE SUNROOF

TECHNICAL FIELD

The present invention relates to a rear drain channel arrangement for an automotive sunroof, and in particular to such a rear drain channel arrangement suitable to be placed immediately below the rear edge of a roof opening of an outer slide type automotive sunroof.

BACKGROUND OF THE INVENTION

The roofs of sports cars often have a limited longitudinal span, and do not afford an adequate space for conventional inner slide sunroof panels. Motor vehicles having a curved roof panel also do not afford an adequate space for an inner slide roof panel without substantially limiting the head clearance of the passenger compartment. To eliminate such problems, and to maximize the opening area of the sunroof for the given roof configuration, outer slide sunroofs are increasingly preferred for automotive sunroofs. In an outer slide sunroof, a rear end of the sunroof panel is lifted before the sunroof panel is slid rearward along the outer surface of the roof.

In an outer slide sunroof panel, a drain channel is required to be placed immediately below the rear edge of the sunroof opening to receive water drips from the fixed roof, as well as below the front and side edges of the sunroof opening. Conventionally, such a rear drain channel was secured, by using threaded bolts, to a roof inner frame which supports slide guide rails for the slide roof panel. In some cases, a rear drain channel was integrally formed in the roof inner frame by stamp forming.

However, there is a growing demand to simplify the sunroof structure, and reduce the overall thickness of the assembly to maximize the head clearance of the passenger compartment. To meet such a demand, it is desired to use extruded aluminum members having a side drain channel and a slide panel guide integrally formed therein. U.S. Pat. No. 5,718,472 issued Feb. 17, 1998 to J. Otake et al and assigned to the common assignee discloses an automotive sunroof of this type. The contents of this patent are hereby incorporated in this application by reference. The extruded aluminum members can be directly attached to the inner surface of the roof panel. However, attaching a rear drain channel member to the side drain channel members creates some problems. Aluminum members are not suited for self-tapping screws. It is therefore desired to attach the rear drain channel member to the roof panel jointly with the side drain channel members. However, the rear drain channel member must extend across the rear ends of the side drain channel members, and it is extremely difficult to allow the rear drain channel member and the side drain channel members to be jointly attached to the roof panel while allowing smooth flow of rainwater from the rear drain channel to the side drain channels.

BRIEF SUMMARY OF THE INVENTION

In view of such problems of the prior art associated with the frameless arrangement for outer slide sunroof systems, a primary object of the present invention is to provide a rear drain channel arrangement for an automotive outer slide sunroof which allows the use of extruded aluminum members for the side frame members without complicating the structure.

A second object of the present invention is to provide a rear drain channel arrangement for an automotive outer slide sunroof which is economical and easy to manufacture.

A third object of the present invention is to provide a rear drain channel arrangement for an automotive outer slide sunroof which is easy to service.

A fourth object of the present invention is to provide a rear drain channel arrangement for an automotive outer slide sunroof which is leak-proof, and can effectively drain rainwater.

According to the present invention, these and other objects can be accomplished by providing a rear drain channel arrangement for a frame structure of an outer slide automotive sunroof, the frame structure comprising a pair of side frame members extending on either side of an opening in an automotive fixed roof, a front drain channel member extending under a front edge of the fixed roof opening across front ends of the side frame members, and a rear drain channel member extending under a rear edge of the fixed roof opening across rear end portions of the side frame members, further comprising: a depending piece extending from each side end portion of the rear drain channel member; and a connecting member adapted to be fitted in an opening formed in one of the side frame members, and having an upper slot adapted to receive the depending piece; wherein the connecting member is provided with a first snap fit arrangement for engagement with the side frame member opening, and a second snap fit arrangement for engagement with the depending piece.

Thus, the attachment of the rear drain channel member to the side frame members can be accomplished simply by pushing the depending piece into the opening in the side frame member with the connecting member interposed between them. The first and second snap fit arrangements can be achieved by any known snap fit arrangement using spring members. However, it is particularly advantageous if the connecting member is made of a molded plastic member because the resiliency of the connecting member can be utilized for the first and second snap fit arrangements. The use of plastic material is also advantageous from the view point of avoiding rust and corrosion which are often the problem with small metallic coil and sheet springs used for known snap fit arrangements. For instance, the connecting member may include a main part fitted in the side frame member opening, and an upper flange having a lower surface adapted to abut an upper surface of the horizontal section of the side frame member. This allows a proper positioning of the connecting member with the upper flange serving as a locating means with respect to the depthwise direction and the main part serving as a locating means with respect to the horizontal directions. In the installed state, the upper flange may provide a damping effect for insulating vibrations, and increase the flexibility of the entire frame structure.

The side frame member is preferably made of an extruded aluminum member having a desired cross section. In such a case, the side frame member opening may be conveniently defined in a horizontal section thereof defining an upper part of a slide panel guide groove for guiding a guide shoe for a support member of a slide panel.

Typically, the first snap fit arrangement includes a resilient projection projecting from a main part of the connecting member which is adapted to engage an edge of the side frame member opening, and the second snap fit arrangement includes a projection projecting from the depending piece, and an opening defined in a part of the connecting member for resiliently receiving the projection. To facilitate the insertion of the depending piece into the connection member while ensuring an adequate retaining force, preferably, the projection is formed on one side of the depending piece, and includes a tapered lower end and a stepped upper end. According to a preferred embodiment of the present invention, the depending piece consists of a vertically and longitudinally extending plate member, and the projection is formed by cutting out a strip from the material of the plate member except for a lower end thereof, and raising an upper end of the strip. In this case, the insertion of the depending piece is facilitated by the resilient deformation of the strip while an adequate retaining force is ensured by the engagement between the raised upper end and the opening in the connecting member.

Similarly, the first snap fit arrangement may include a resilient piece extending downward in the connecting member, and having a barbed lower end which is adapted to engage an edge of the side frame member opening. Also, the second snap fit arrangement may include a resilient tongue piece formed in the connecting member, the tongue piece extending downward, and having a barbed free end, the depending piece being provided with an opening adapted to resiliently receive the barbed free end. In either case, it is possible to conveniently utilize the resiliency of the connecting member itself.

According to another embodiment of the present invention, the connecting member comprises a lower flange which fits into a groove formed in the side frame member, a main part having a tongue piece extending downward, and having a barbed free end which is adapted to fit into an opening provided in the depending piece, an upper flange having a lower surface adapted to abut an upper surface of a horizontal section extending from an upper end of an upright wall of the side frame member, and a resilient piece extending downward, and having a barbed lower end which is adapted to engage an edge of the side frame member opening.

In this case, the connecting member is retained with respect to the side frame member by the engagement between the lower flange and the groove, and the engagement between the resilient piece and an edge of the side frame member opening. Thus, the attachment and removal of the connecting member can be accomplished by a pivotal movement of the connecting member around the point of engagement between the lower flange and the groove which is followed by the engagement between the resilient piece and an edge of the side frame member opening so that a highly secure engagement between the connecting member and the side frame member can be accomplished without compromising the ease of assembly and servicing. To ensure a secure engagement between the depending piece and the corresponding tongue piece of the connecting member, the lower flange may be provided with a rib which supports the depending piece, as it engages the barbed free end of the tongue piece, from an opposite side thereof. In this case, the side frame member opening may consist of a notch formed in the horizontal section of the side frame member or a horizontal extension thereof.

According to yet another embodiment of the present invention, the first snap fit arrangement includes a resilient piece which resiliently but detachably retains the connecting member in the opening, the depending piece interfering with the resilient piece so as to prevent removal of the connecting member from the side frame member opening when the depending piece is received in the connecting member. Thus, a highly secure retaining force may be achieved between the connecting member and the side frame member opening once the depending piece is fitted into the connecting member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
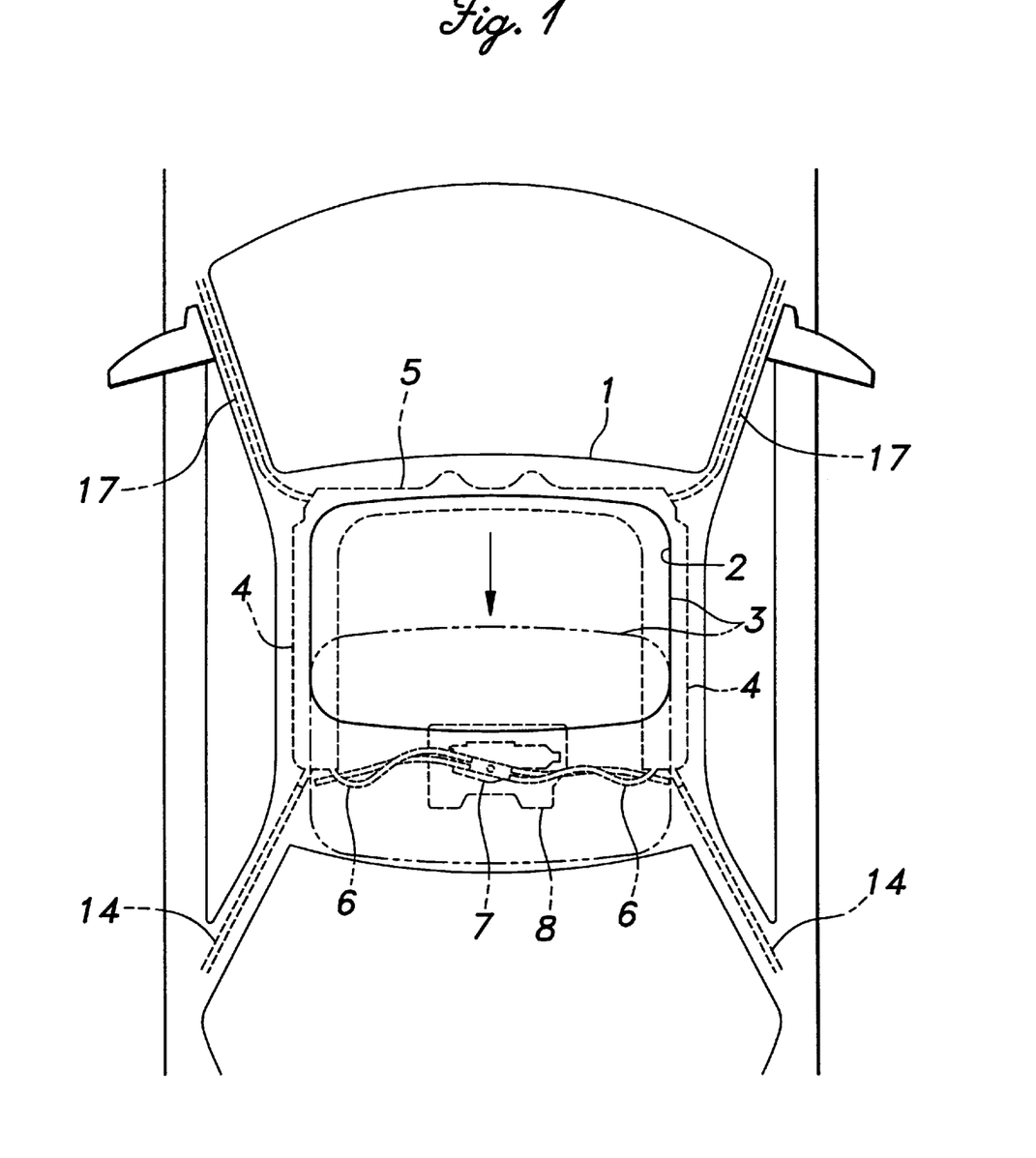
FIG. 1 is a plan view of an automotive fixed roof fitted with an outer slide sunroof embodying the present invention.

FIG. 1 illustrates a fixed roof of a motor vehicle equipped with an outer slide sunroof embodying the present invention. A somewhat laterally elongated rectangular opening 2 is defined in this fixed roof 1, and this opening can be selectively opened and closed by a slide panel 3 (its open position shown by imaginary lines in FIG. 1) which is essentially made of sheet glass and adapted to be slid over the part of the fixed roof immediately behind the opening 2.

A pair of side frame members 4 extending longitudinally along either side of the opening 2, and a front frame member 5 extending laterally across the front ends of the side frames 4 are attached to the peripheral margin of the inner surface of the fixed roof 1. A motor assembly 7 including a reduction gear unit for actuating the slide panel 3 with a push-pull cable 6 is attached to a part of the inner surface of the roof panel located between the rear ends of the side frame members 4 via a bracket 8.

Figure 2:
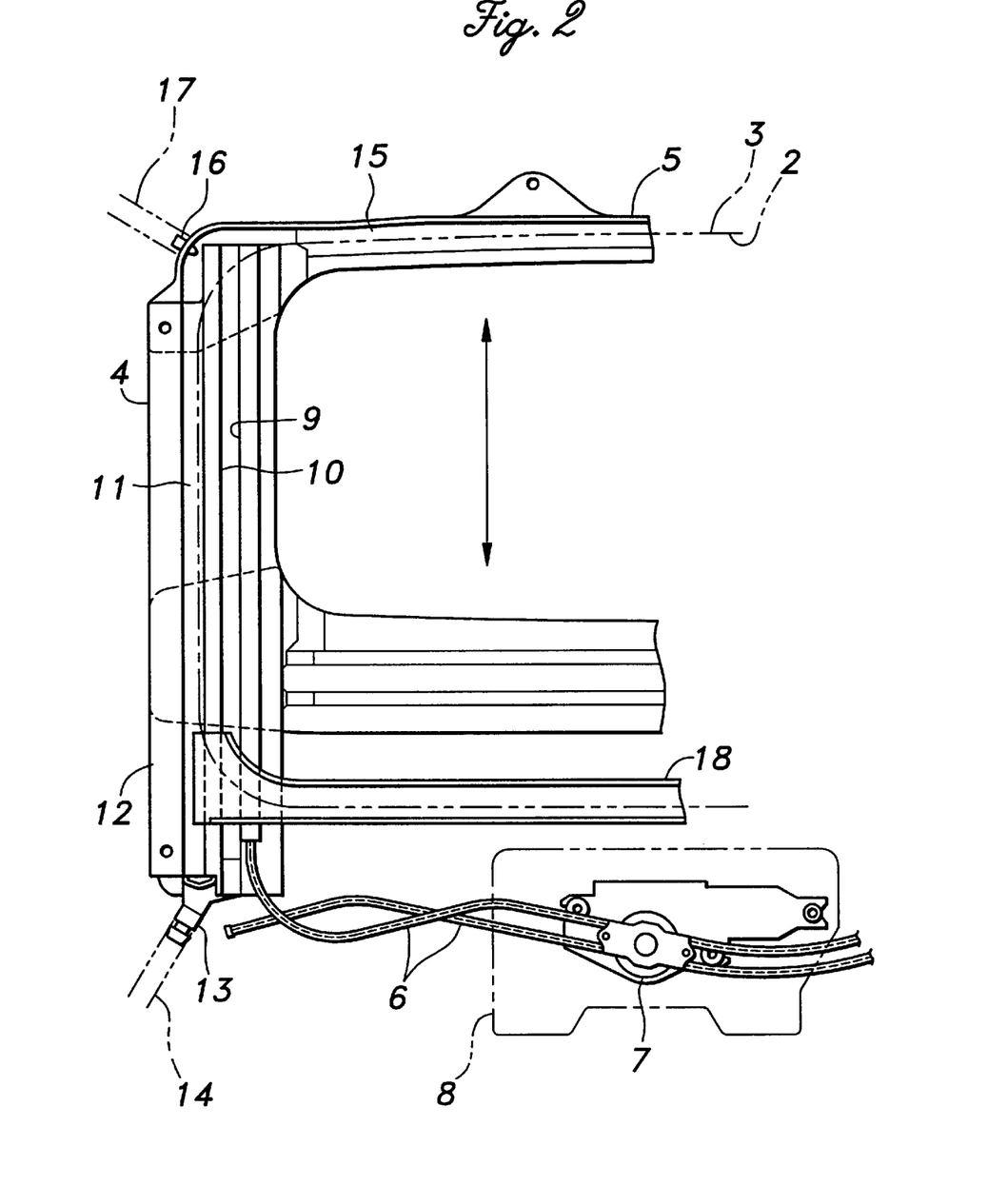
FIG. 2 is an enlarged fragmentary plan view of the frame of the outer slide sunroof.
Figure 3:
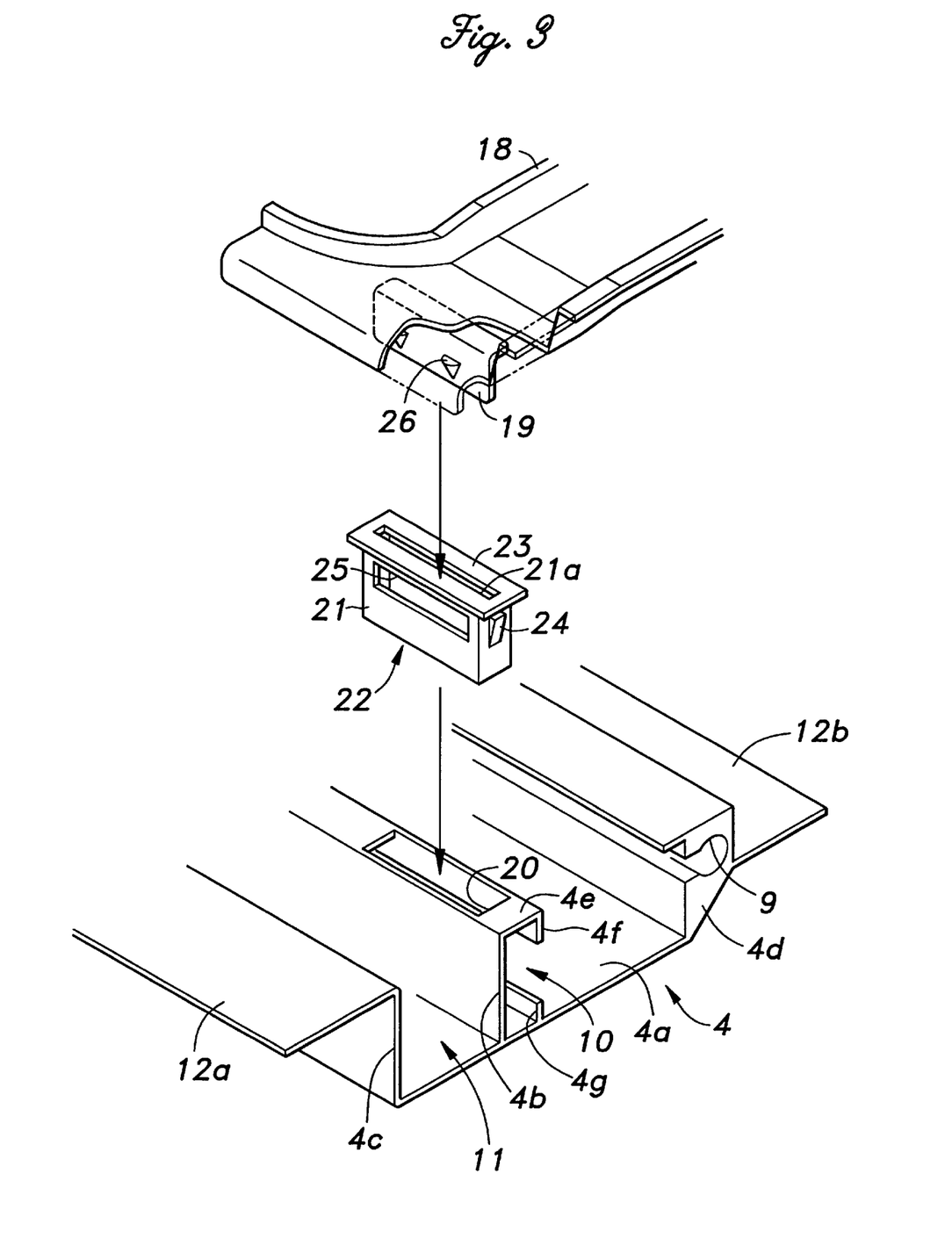
FIG. 3 is a fragmentary exploded view of a first embodiment of the present invention.

The side frame members 4 are made of extruded aluminum members, and, as shown in FIGS. 2 and 3, are each given with a specific cross-section so as to define various grooves as more fully described hereinafter. Referring to FIG. 3, each side frame member 4 includes a planar bottom wall 4a, a middle upright wall 4b, an outer upright wall 4c, and an inner upright wall 4d which has a somewhat larger thickness than the other upright walls. As can be readily appreciated, these side frames members 4 are mirror images of each other with respect to the longitudinal center line of the vehicle body. In the following description, only one of them is described for the convenience of description.

The upper end of the middle upright wall 4b is perpendicularly bent inward so as to define a horizontal section 4e which in turn is bent perpendicularly downward at a free end thereof so as to define a vertical flange 4f. A small upright wall 4g extends from the bottom wall 4a in alignment with the vertical flange 4e. The middle upright wall 4b, the vertical flange 4f, the horizontal section 4e, the bottom wall 4a, and the small upright wall 4g jointly define a C-shaped rectangular slide panel guide groove 10 opening inward or toward the center of the vehicle body to guide a slide shoe (not shown in the drawings) of a support member of the slide panel 3. A push-pull cable guide groove 9 having a C-shaped cross-section and opposing the slide panel guide groove 10 is formed in the inner upright wall 4d. A drain channel 11 having a U-shaped cross section is defined by the outer upright wall 4c, the bottom wall 4a, and the middle upright wall 4b. The upper end of the outer upright wall 4c is perpendicularly bent outward so as to define a horizontal mounting flange 12a for mounting the sunroof assembly to the inner surface of the fixed roof 1. The outer surface of a vertically middle part of the inner upright wall 4d is provided with a horizontal flange 12b which defines the inner periphery of the sunroof opening, and is adapted to be fitted with a ornamental edge molding (not shown in the drawings) and, if desired, an arrangement for guiding a slide sunshade board not shown in the drawing.

The drain channel 11 receives moisture which flows down from the outer surface of the adjacent part of the fixed roof 1, and conducts it either to the front or the rear end of the drain channel 11. The moisture which has been conducted to the rear end of the drain channel 11 is expelled from the vehicle body via a channel end member 13 attached to the rear end of the side frame member 4, and a drain tube 14 connected to the channel end member 13 and passed through the corresponding rear pillar (see FIG. 1). The moisture which has been conducted to the front end of the drain channel 11 is expelled from the vehicle body via a socket member 16 attached to a side of the front end of the side frame member 4, and a drain tube 17 connected to the socket member 16 and passed through the corresponding front pillar, along with the moisture which has been collected in a front drain channel defined in the front frame member 5 which is made of stamp formed steel plate (see FIG. 1).

A rear drain channel member 18 which is made of stamp formed steel plate, and having a U-shaped cross section extends across rear end portions of the side frame members 4. The rear drain channel member 18 is located beneath the rear edge of the sunroof opening 2 of the fixed roof 1 so that the moisture flowing down from the part of the upper surface of the fixed roof adjacent to the rear edge of the sunroof opening 2 may be collected therein. Each side end of this rear drain channel member 18 terminates at a middle point of the drain channel 11 of the corresponding side frame member 4.

A depending piece 19 is attached to a lower surface of each side end portion of the rear drain channel member 18. This depending piece 19 essentially consists of a plate member extending longitudinally and vertically, and is provided with a pair of projections 26 which are raised from the material on one side thereof. These projections are each formed on one side of the corresponding depending piece 19, and include a tapered lower end and a stepped upper end. This depending piece 19 is adapted to be fitted into a rectangular opening 20 defined in the horizontal section 4e at the upper end of the middle upright wall 4b of the side frame 4, via a connecting member 22 made of plastic material. The connecting member 22 is provided with a first snap fit arrangement for attaching the connecting member 22 to the side frame member 4, and a second snap fit arrangement for retaining the depending piece 19 in the connecting member 22. The details of these snap fit arrangements are described in the following in more detail.

The connecting member 22 is box-shaped with an open bottom and a open upper end provided with an elongated slot 21a and a flange 23. The front and rear ends of the main part 21 of the connecting member 22 are each provided with a resilient projection 24 which allows the main part of the connecting member 22 to be snap fitted into the opening 20. This constitutes the first snap fit arrangement. When the connecting member 22 is finally fitted into the opening 20, the edges defining the front and rear ends of the opening 20 are interposed between the flange 23 and the corresponding resilient projections 24. The outer side wall of the main part 21 of the connecting member 22 is provided with a horizontally elongated slot 25 which is adapted to snap fit the projections 26 of the corresponding depending member 19. This constitutes the second snap fit arrangement.

Thus, the connecting member 22 allows the depending piece 19 to be snap fitted into the opening 20, and allows the rear drain channel member 18 to be attached to the side frame member 4 in a highly simple manner and requiring a minimum number of components for fastening. In particular, by selecting the material of the connecting member 22 from those plastic materials which are both resilient and durable, it is possible to attach the rear drain channel member 18 to the side frame member 4 both easily and firmly while allowing the rear drain channel member 18 to be detached from the side frame member 4 both simply and without damaging any parts. In particular, once the connecting member 22 is fitted in the opening 20, and the depending piece 19 is fitted into the elongated slot 21a of the connecting member 22, the depending piece 19, in cooperation with the peripheral edge of the opening 20, constrains or interferes with the connecting member 22 against deformation in such a manner that the connecting member 22 is securely retained in the opening 20. Thus, this arrangement is advantageous for both assembling and servicing view points.

Figure 4:
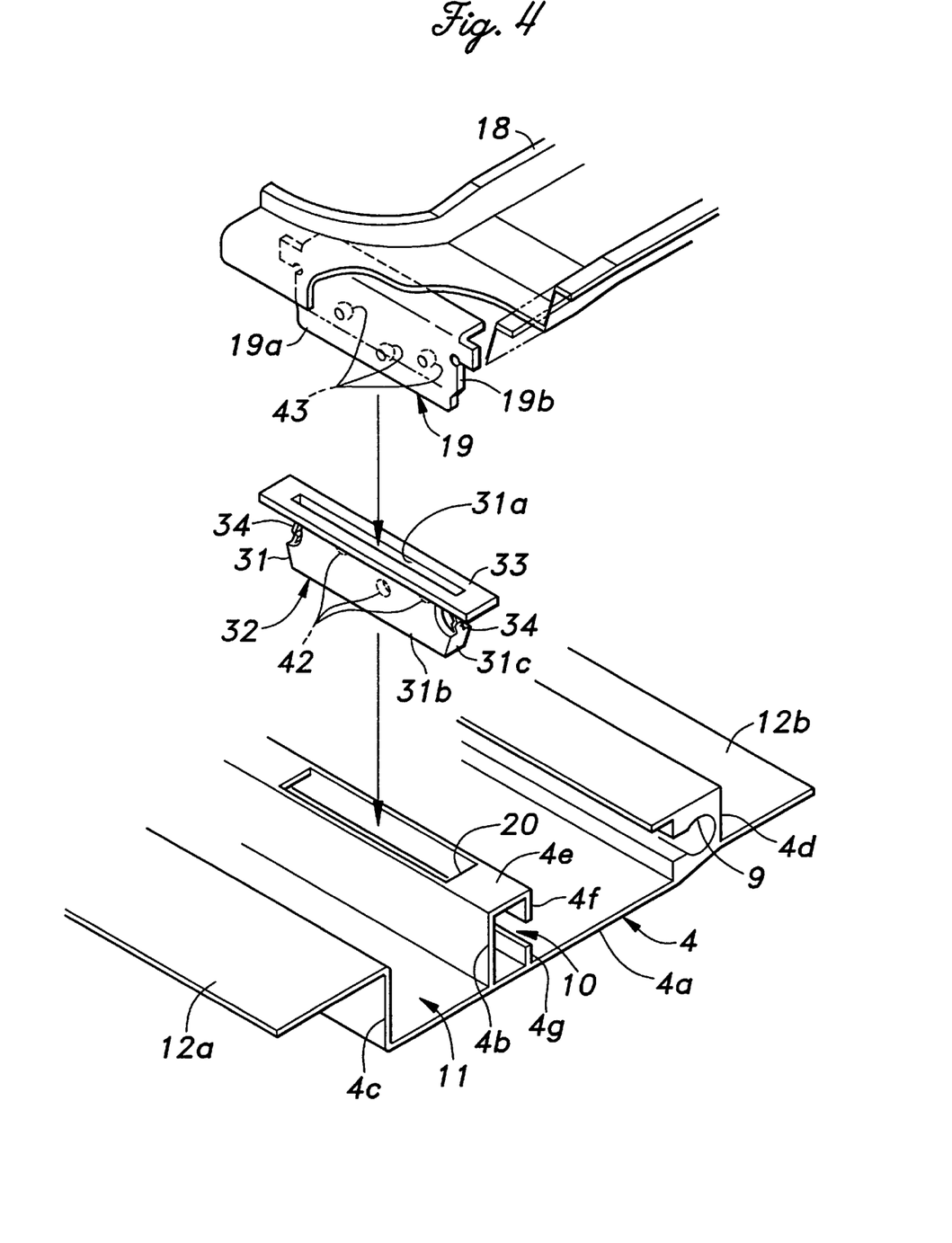
FIG. 4 is a view similar to FIG. 3 showing a second embodiment of the present invention.
Figure 5:
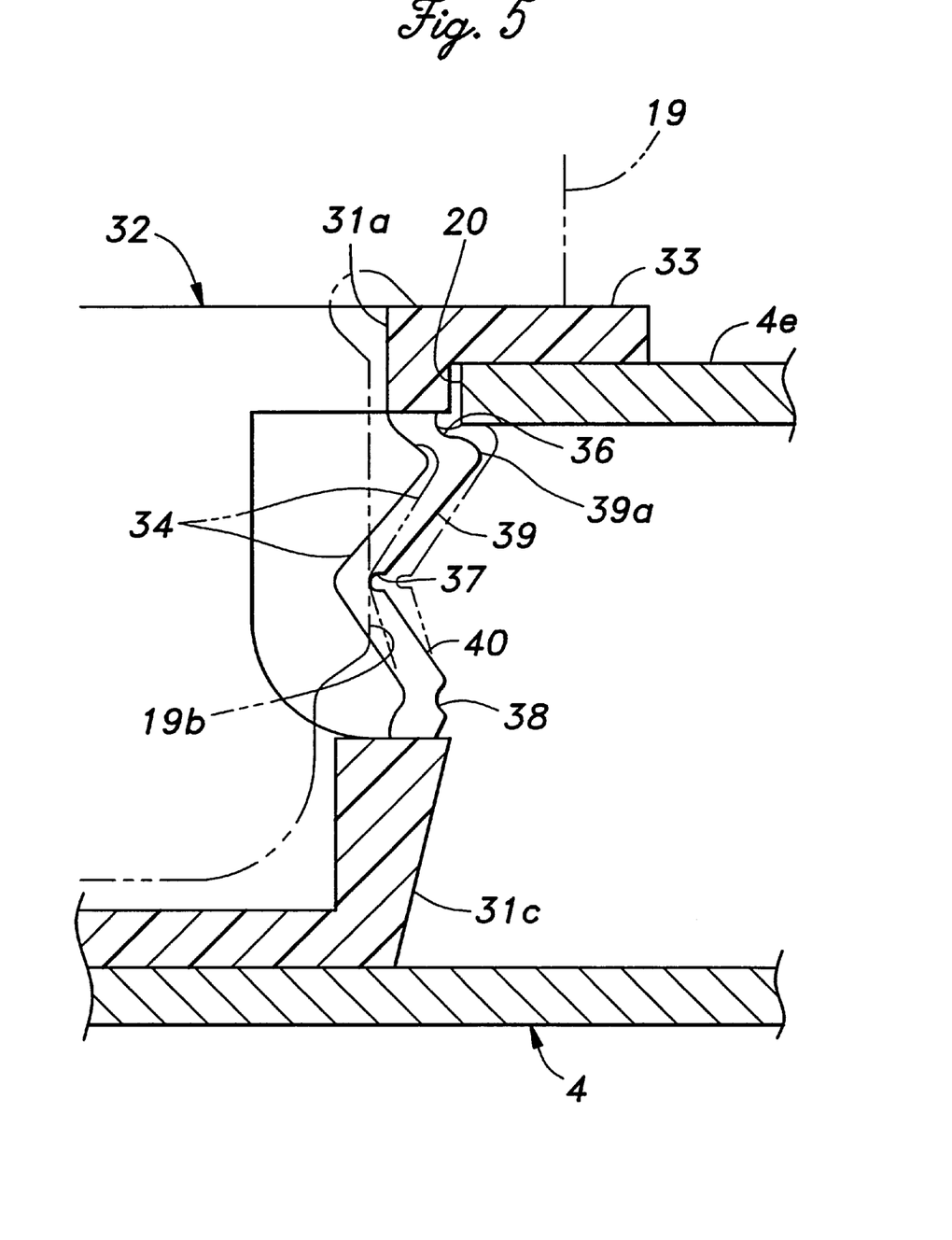
FIGS. 5 and 6 are enlarged sectional views showing different parts of the second embodiment.
Figure 6:
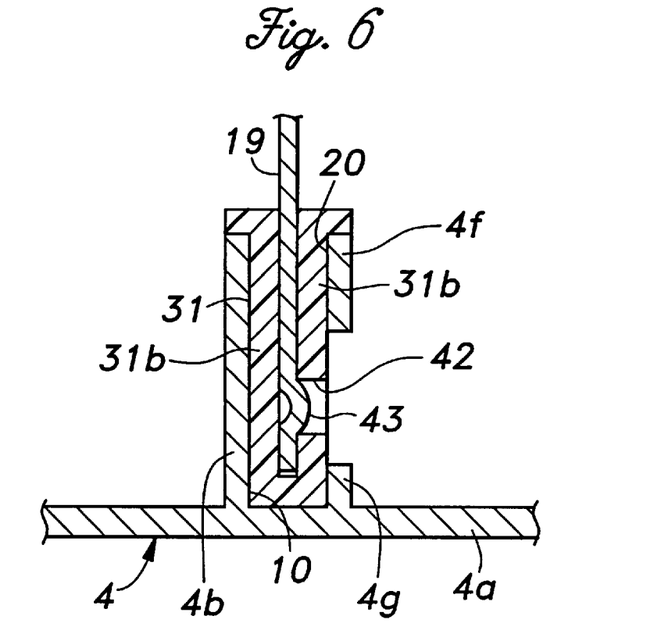

FIGS. 4 to 6 show a second embodiment of the present invention. In these drawings, the parts corresponding to those of the previous embodiment are denoted with like numerals. This embodiment includes a depending piece 19 which is similar to that of the previous embodiment, but, in this case, the depending piece 19 is provided with three inwardly directed circular projections 43 on one side 19a thereof which are formed by applying three circular punches from outside, and causing a required plastic deformation.

The connecting member 32 is likewise made of a resilient and durable plastic material, and molded into a box-shape with an open bottom end and an open top end which, however, is provided with a horizontal flange 33. The outer side wall 31b of the main part 31 of the connecting member 32 is substantially solid, but the inner side wall 31b of the main part 31 of the connecting member 32 is provided with three openings 42 which are adapted to resiliently receive the circular projections 43 of the depending piece 19 when the depending piece 19 is fully received into the elongated slot 31a defined in the upper end of the connecting member 32.

The front and rear walls 31c of the main part 31 of the connecting member 32 are tapered so as to facilitate the insertion of the main part 31 of the connecting member 32 into the opening 20 of the horizontal section 4e of the middle upright wall 4b. The junction between the flange 33 and each of the front and rear walls 31c of the main part 31 of the connecting member 32 is recessed by cutting out the material of the side walls 31b and the corresponding end wall 31c, except for a thin walled strip 34 extending from the top end of the corresponding end wall 31c and the opposing lower surface of the flange 33. As best shown in FIG. 5, the thin walled strip 34 has even more thinned portions 36, 37 and 38 in the middle and both ends thereof in such a manner that the strip may behave as a pair of serially and pivotably connected links 39 and 40. Initially, the strip 34 interferes with the horizontal section 4e at an upper end 39a of the upper link 39, and with a rear edge 19b of the depending piece 19a at the middle thinned portion 37 as indicated by the solid lines in FIG. 5.

However, when the connecting member 32 alone is fitted into the opening 20, the strip 34 resiliently yields so that the main part 31 of the connecting member 32 is fully fitted into the opening 20 until the lower surface of the flange 33 abuts the upper surface of the horizontal section 4e of the middle upright wall 4b. In this state, it is still possible to remove the connecting member 32 from the opening 20 because the strip 34 is resilient enough to accommodate a resilient deformation which is required for the removal of the connecting member 32 from the opening 20. However, when the depending piece 19 is fitted into the elongated slot 31a at the upper end of the connecting member 32, the middle thinned portion 37 is pushed outward as indicated by the imaginary lines in FIG. 5. When the strip 34 is constrained by the depending piece 19 in this manner, the strip 34 cannot yield or deflect enough to allow the connecting member 32, along with the depending piece 19, to be removed from the opening 20 because the upper end 39a of the upper link 39 interferes with the opposing edge of the horizontal section 4e to such an extent.

Thus, once the connecting member 32 is fully fitted into the opening 20, and the depending piece 19 is additionally snap fitted into the elongated slot 31a at the upper end of the connecting member 32, the depending piece 19 is kept fitted in the connecting member 32 by virtue of the engagement between the projections 43 and the openings 42, and the connecting member 32 is firmly lodged in the opening 20 by virtue of the engagement between the strip 34 and the edge of the horizontal section 4e defining the corresponding end of the opening 20. Thereby, the depending piece 19 along with the rear drain channel member 18 is securely attached to the corresponding side frame member 4.

Thus, according to this embodiment also, the connecting member 32 allows the depending piece 19 to be snap fitted into the opening 20, and allows the rear drain channel member 18 to be attached to the side frame member 4 in a highly simple manner and requiring a minimum number of components for fastening. This embodiment also provides the advantage of ease of both assembling and servicing. In particular, by inserting a tip of a screw driver or the like in the gap between a side wall 31b of the main part 31 of the connecting member 32 and the opposing surface of the depending piece 19 so as to dislodge the circular projections 43 from the corresponding openings 42, the depending piece 19 can be easily removed from the opening 20 of the side frame member 4.

Figure 7:
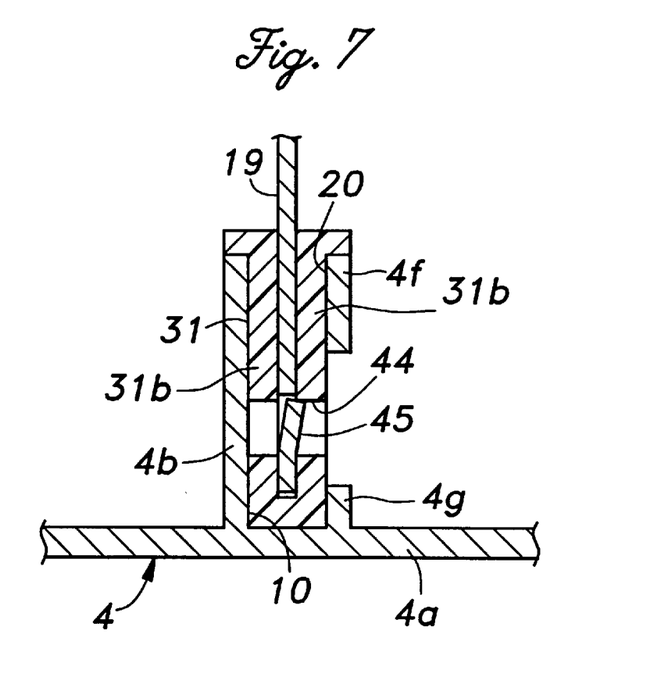
FIG. 7 is a view similar to FIG. 6 showing a third embodiment of the present invention.

FIG. 7 shows a third embodiment of the present invention which is similar to the second embodiment. The only difference can be found in the provision of projections 45 each formed by cutting a piece of the material of the depending piece 19 except for a lower end thereof and raising this piece instead of the circular projections 43 of the previous embodiment which were formed by the application of punches. According to the third embodiment, the retaining force is greater than the second embodiment. Removing the depending piece 19 from the opening 20 in this case can also be readily accomplished by pushing the projections 45 or the raised pieces into the original plane by inserting pointed tips from openings 44 formed in the side walls 31b of the main part 31 of the connecting member 32.

Figure 8:
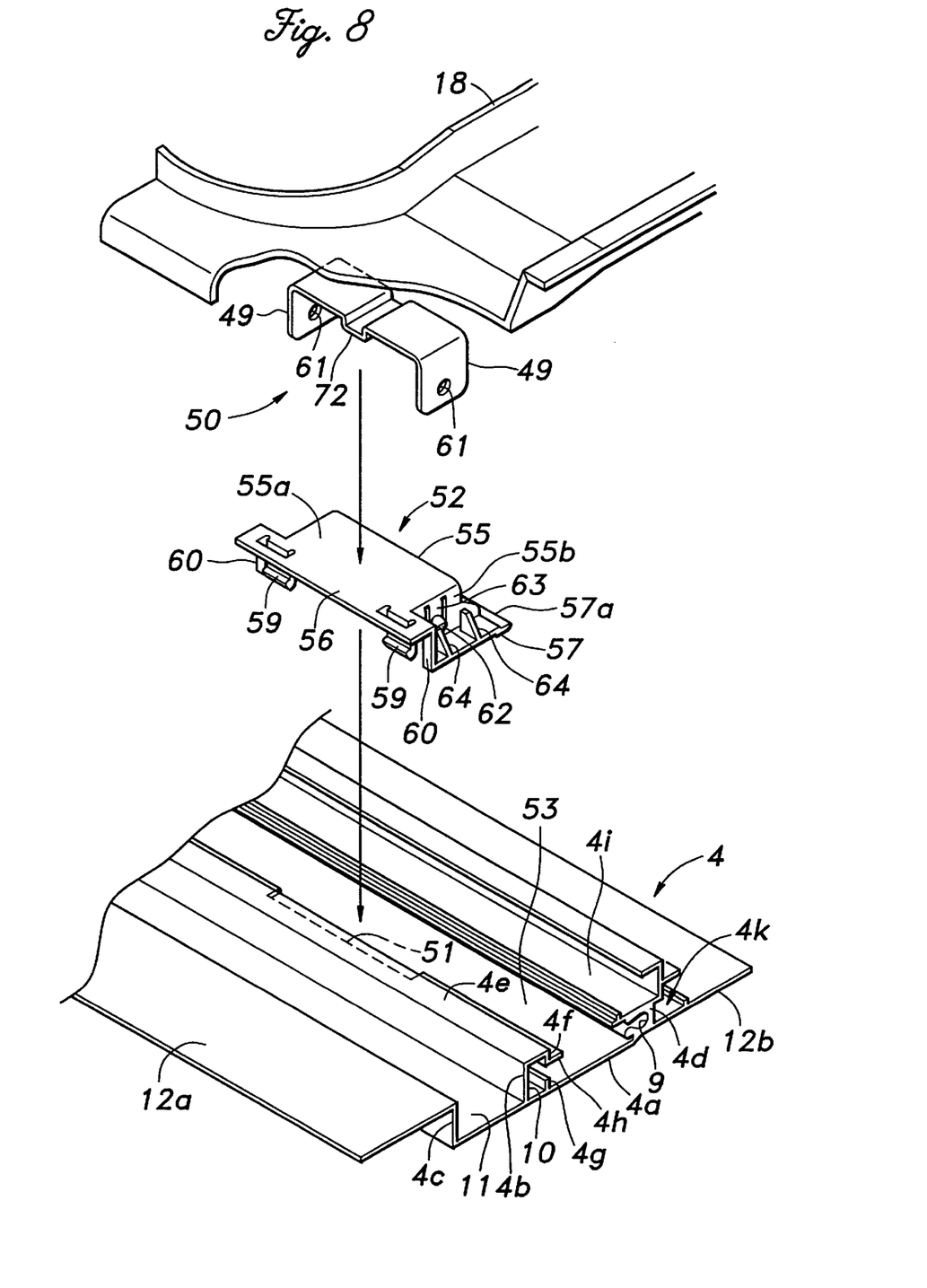
FIG. 8 is a view similar to FIG. 3 showing a fourth embodiment of the present invention.
Figure 9:
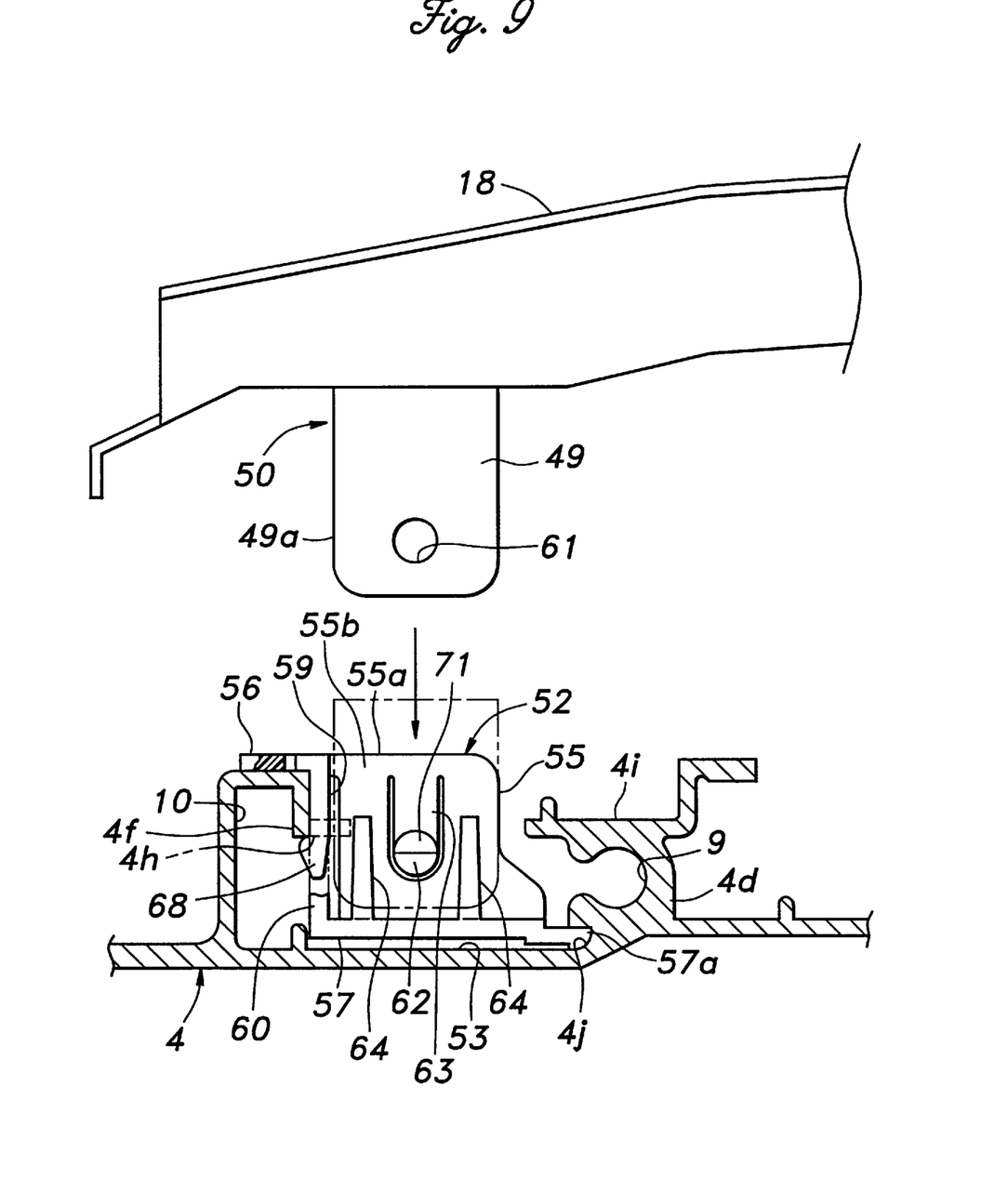
FIG. 9 is a sectional rear view of the fourth embodiment of the present invention.
Figure 10:
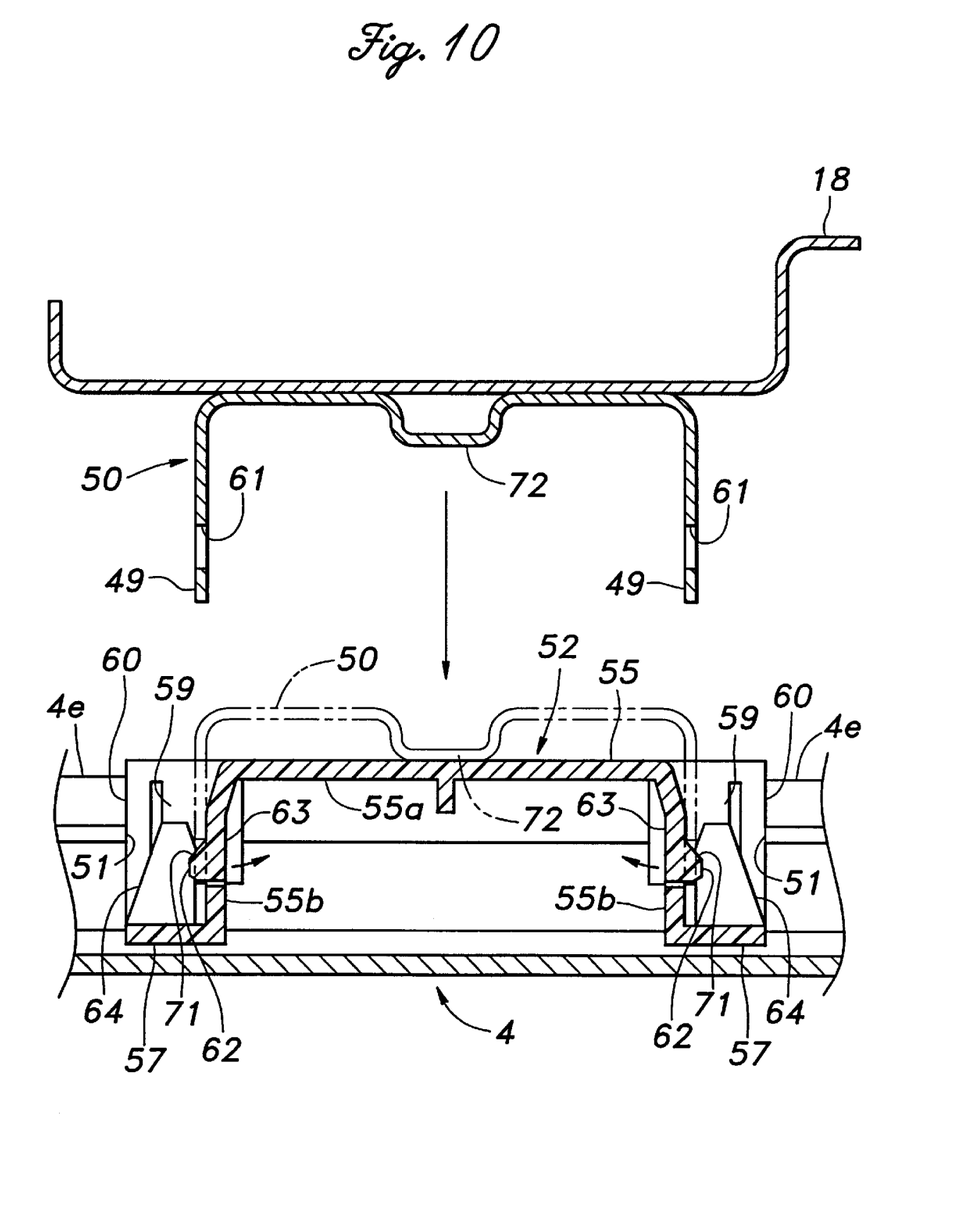
FIG. 10 is a sectional side view of the fourth embodiment of the present invention.

FIGS. 8 to 10 show a fourth embodiment of the present invention. Again, in these drawings, parts corresponding to those of the previous embodiments are denoted with like numerals. A bracket 50 made of a plate member and bent into the shape of letter-M as seen from a side is attached, for instance by spot welding, to the lower surface of each side end of the rear drain channel member 18. A pair of depending pieces 49 are defined by a pair of depending legs of this bracket 50. Each of the depending pieces 49 is provided with a circular opening 61. A ridge 72 defining a flat end surface is formed in the middle part of the bracket 50.

Each of the side frame members 4 in this case is somewhat different from those used in the previous embodiments. The lower end of the vertical flange 4f is provided with a flange-shaped inwardly directed extension 4h. The inner upright wall 4d is provided with an outwardly directed horizontal extension 4i at a vertically middle portion thereof, and a groove 4j at a base of the inner upright wall 4d facing the middle upright wall 4b. A channel 53 is defined between the middle upright wall 4b and the inner upright wall 4d. This channel 53 provides a passage for a support member of the slide panel 3, and a slider shoe for the support member which are not shown in the drawings. The inwardly directed flange 12b of the side frame member 4 in this case extends from a lower part of the inner upright wall 4d, and a sunshade guide groove 4k is defined along the upper surface of the base end of the inwardly directed flange 12b for guiding the inner sunshade board which is not shown in the drawings.

The connecting member 52 comprises a box-shaped main part 55 having an open bottom end, an outwardly directed upper flange 56 formed as a lateral extension of the top wall 55a of the main part 55, and a lower flange 57 extending from the lower end of the side wall 55b of the main part 55 in three directions, or forwardly, inwardly and rearwardly. The connecting member 52 in this case consists of an integrally molded plastic member. A rectangular notch 51 is formed in a part of the inwardly directed horizontal extension 4h of the vertical flange 4f extending from the middle upright wall 4b to engage a pair of resilient pieces 59 depending from the upper flange 56 of the connecting member 52. For reinforcement, the base end of the upper flange 56 are connected to the front and rear parts of the lower flange 57 via integral strips 60.

The front and rear end walls 55b of the main part 55 of the connecting member 52 are each provided with a tongue piece 63 which is cut out from the material of the end wall 55b except for its upper end so as to be given with a flexibility and resilience, and a projection 62 extends outwardly from each of these tongue pieces 63. The upper half of the end surface of each of these projections 62 is formed as an inclined surface 71 (FIG. 10). A pair of triangular ribs 64 project from the upper surface of the lower flange 57 adjacent to the rear end wall 55b of the main part 55 of the connecting member 52. A similar pair of triangular ribs also project from the upper surface of the lower flange 57 adjacent to the front end wall of the main part 55 although they are hidden from view in FIG. 8.

Thus, when fitting the connecting member 52 into the designated part of the channel 53, the outer edge 57a of the lower flange 57 (facing the center of the vehicle body) is fitted into the groove 4j at the base of the inner upright wall 4d, and the main part 55 of the connecting member 52 is pushed down onto the bottom surface of the channel 53 using the outer edge 57a as a pivot center for this inserting movement. The resilient pieces 59 initially oppose this inserting movement, but once the barbed forward ends 68 of the resilient pieces 59 pass through the notch 51 and clear the lower edge of the vertical flange 4f, the connecting member 52 is snap fitted in position with the lower surface of the upper wall 56 abutting the upper surface of the horizontal section 4e at the upper end of the middle upright wall 4b. Additionally, the vertical strips 60 abut the opposing surfaces of the vertical flange 4f and the small upright wall 4g. The connecting member 52 in this state is firmly held against lateral movement by the middle upright wall 4b (and the parts associated with it) and the inner upright wall 4d (in particular by the groove 4j at its base), and against vertical movement by the bottom surface of the channel 53, the groove 4j engaging the outer edge 57a of the lower flange 57 and the lower edge of the vertical flange 4f engaging the barbed free ends 68 of the resilient pieces 59. The vertical strips 60 also abut the front and rear edges of the notch 51, and firmly hold the connecting member 52 against fore-and-aft movement.

Thereafter, the depending pieces 49 are each fitted into the gap between the corresponding pair of triangular ribs 64 and the opposing tongue piece 63 until the projection 62 is fitted into the circular opening 61. The inclined surface 71 formed in the upper half of the end surface of the projection 62 resiliently urges the tongue piece 63 inward to permit the insertion of the depending piece 61 into the gap, and once the depending piece 61 is fully inserted in the gap, the projection 62 is fully received in the opening 61, and the tongue piece 63 is resiliently restored to the original state. In this state, the engagement between the opening 61 and the projection 62 positively holds the depending piece 19 against any upward movement, and the ridge 72 formed in the middle part of the bracket 50 abuts the upper surface of the connecting member 52. Each depending piece 49 is firmly held against fore-and-aft movement by the triangular ribs 64 and the opposing end wall 55b of the main part 55 of the connecting member 52, and against lateral movement by the opposing parts of the connecting member 52.

When the rear drain channel member 18 is desired to be removed, it can be accomplished by pushing the projections 62 out of the openings 61 against the spring force of the tongue pieces 63 by using the pointed ends of screw drivers or the like, the depending pieces 49 can be lifted out of the gaps in the connecting member 52, and away from the connecting member 52. The connecting member 52 can be removed by deflecting the resilient pieces 59 by using the tips of screw drivers or the like out of engagement from the notch 51, and lifting the upper flange 56 away from the horizontal section 4e of the middle upright wall 4b.

In this case, the connecting member 52 is retained with respect to the side frame member 4 by the engagement between the lower flange 57 and the groove 4j, and the engagement between the resilient pieces 59 and an edge of the side frame member opening 51. Thus, the attachment and removal of the connecting member can be accomplished by a pivotal movement of the connecting member around the point of engagement between the lower flange and the groove which is followed by the engagement between the resilient pieces and an edge of the side frame member opening so that a highly secure engagement between the connecting member and the side frame member can be accomplished without compromising the ease of assembly and servicing. In this case, the side frame member opening consisted of a notch formed in the horizontal section of the side frame member or a horizontal extension thereof, but it may also consist of an opening as disclosed in the previous embodiments.

Although the present invention has been described in terms of preferred embodiments thereof, it is obvious to a person skilled in the art that various alterations and modifications are possible without departing from the scope of the present invention which is set forth in the appended claims.

We claim:

1. A rear drain channel arrangement for a frame structure of an outer slide automotive sunroof, said frame structure comprising a pair of side frame members extending on either side of an opening in an automotive fixed roof, a front drain channel member extending under a front edge of said fixed roof opening across front ends of said side frame members, and a rear drain channel member extending under a rear edge of said fixed roof opening across rear end portions of said side frame members, further comprising:

a depending piece extending from each side end portion of said rear drain channel member; and a connecting member adapted to be fitted in an opening formed in one of said side frame members, and having a gap adapted to receive said depending piece;

wherein said connecting member is provided with a first snap fit arrangement for engagement with said side frame member opening, and a second snap fit arrangement for engagement with said depending piece.

2. A rear drain channel arrangement according to claim 1, wherein said side frame member opening is defined in a horizontal section thereof defining an upper part of a slide panel guide groove for guiding a guide shoe for a support member of a slide panel.

3. A rear drain channel arrangement according to claim 2, wherein said connecting member consists of a molded plastic member.

4. A rear drain channel arrangement according to claim 3, wherein said connecting member includes a main part fitted in said side frame member opening, and an upper flange having a lower surface adapted to abut an upper surface of said horizontal section.

5. A rear drain channel arrangement according to claim 1, wherein said connecting member consists of a molded plastic member.

6. A rear drain channel arrangement according to claim 5, wherein said first snap fit arrangement includes a resilient projection projecting from a main part of said connecting member which is adapted to engage an edge of said side frame member opening.

7. A rear drain channel arrangement according to claim 5, wherein said second snap fit arrangement includes a projection projecting from said depending piece, and an opening defined in a part of said connecting member for resiliently receiving said projection.

8. A rear drain channel arrangement according to claim 7, wherein said projection is formed on one side of said depending piece, and includes a tapered lower end and a stepped upper end.

9. A rear drain channel arrangement according to claim 7, wherein said depending piece consists of a vertically and longitudinally extending plate member, and said projection is formed by cutting out a strip from the material of said plate member except for a lower end thereof, and raising an upper end of said strip.

10. A rear drain channel arrangement according to claim 5, wherein said first snap fit arrangement includes a resilient piece extending downward, and having a barbed lower end which is adapted to engage an edge of said side frame member opening.

11. A rear drain channel arrangement according to claim 5, wherein said second snap fit arrangement includes a resilient tongue piece formed in said connecting member, said tongue piece extending downward, and having a barbed free end, said depending piece being provided with an opening adapted to resiliently receive said barbed free end.

12. A rear drain channel arrangement according to claim 5, wherein said connecting member comprises a lower flange which fits into a groove formed in said side frame member, a main part having a tongue piece extending downward, and having a barbed free end which is adapted to fit into an opening provided in said depending piece, an upper flange having a lower surface adapted to abut an upper surface of a horizontal section extending from an upper end of an upright wall of said side frame member, and a resilient piece extending downward, and having a barbed lower end which is adapted to engage an edge of said side frame member opening.

13. A rear drain channel arrangement according to claim 12, wherein said lower flange is provided with a rib which supports said depending piece, as it engages said barbed free end of said tongue piece, from an opposite side thereof.

14. A rear drain channel arrangement according to claim 12, wherein said side frame member opening consists of a notch formed in a horizontal extension of said horizontal section.

15. A rear drain channel arrangement according to claim 1, wherein said first snap fit arrangement includes a resilient piece which resiliently but detachably retains said connecting member in said opening, said depending piece interfering with said resilient piece so as to prevent removal of said connecting member from said side frame member opening when said depending piece is received in said connecting member.

* * * * *